(12) United States Patent
Han et al.

(10) Patent No.: US 11,790,672 B2
(45) Date of Patent: Oct. 17, 2023

(54) IMAGE PROCESSING METHOD, MICROSCOPE, IMAGE PROCESSING SYSTEM, AND MEDIUM BASED ON ARTIFICIAL INTELLIGENCE

(71) Applicant: Tencent Technology (Shenzhen) Company Limited, Shenzhen (CN)

(72) Inventors: Baochang Han, Shenzhen (CN); Xiao Han, Shenzhen (CN); Yong Chen, Shenzhen (CN); Peng Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 44 days.

(21) Appl. No.: 17/482,177

(22) Filed: Sep. 22, 2021

(65) Prior Publication Data
US 2022/0012457 A1    Jan. 13, 2022

Related U.S. Application Data

(63) Continuation of application No. PCT/CN2020/115214, filed on Sep. 15, 2020.

(30) Foreign Application Priority Data

Sep. 27, 2019  (CN) .......................... 201910924607.1

(51) Int. Cl.
*G06V 20/69* (2022.01)
*G06T 7/62* (2017.01)
(Continued)

(52) U.S. Cl.
CPC ........... *G06V 20/695* (2022.01); *G02B 21/34* (2013.01); *G02B 21/367* (2013.01); *G06T 7/62* (2017.01); *G06T 2207/10056* (2013.01)

(58) Field of Classification Search
CPC .... G06V 20/695; G06V 20/69; G06V 20/698; G02B 21/34; G02B 21/367;
(Continued)

(56) References Cited

U.S. PATENT DOCUMENTS 11,030,758 B2 *   6/2021   Rhodes ..................... G06T 7/37
11,175,490 B1 *  11/2021   Bian ..................... G02B 21/361
(Continued)

FOREIGN PATENT DOCUMENTS

CN    203950071 U    11/2014
CN    104794710 A     7/2015
(Continued)

OTHER PUBLICATIONS

Chen et al, "An Augmented reality microscope with real-time artificial intelligence integration for cancer diagnosis", Published Aug. 12, 2019, Nature Medicine (Year: 2019).*
(Continued)

*Primary Examiner* — Tom Y Lu
(74) *Attorney, Agent, or Firm* — Morgan, Lewis & Bockius LLP (57) ABSTRACT

Embodiments of the present disclosure provide an image processing method based on artificial intelligence (AI) and an image processing system. The method includes: obtaining a feature recognition result of an image by performing image processing on the image to recognize a feature of the image and the image being obtained by performing image acquisition on a section of a patient using a digital slide scanner to generate a whole slide image (WSI) as the image; determining an imaging area of the section within a field of view of an eyepiece of a microscope with which real-time imaging is performed on the section; determining, within the image, an image area corresponding to the imaging area of the section and acquiring, from the feature recognition result
(Continued)

of the image, a target feature recognition result of the image area; and superimposing the target feature recognition result on the imaging area of the section.

20 Claims, 8 Drawing Sheets (51) Int. Cl.
  *G02B 21/34* (2006.01)
  *G02B 21/36* (2006.01)
(58) Field of Classification Search
  CPC ............... G02B 21/365; G06T 7/62; G06T 2207/10056; G06T 2207/20081; G06T 2207/20084; G06T 2207/30024; G06T 7/11
  See application file for complete search history.

(56) References Cited

U.S. PATENT DOCUMENTS

| | | | |
|---|---|---|---|
| 11,237,373 B2* | 2/2022 | Mak | H04N 5/232 |
| 11,250,563 B2* | 2/2022 | Chen | G06T 7/0012 |
| 11,265,449 B2* | 3/2022 | Liao | H04N 5/2256 |
| 11,341,635 B2* | 5/2022 | Chen | G06N 3/0454 |
| 2011/0266438 A1 | 11/2011 | Harada et al. | |
| 2013/0071876 A1 | 3/2013 | Hao et al. | |
| 2017/0329123 A1 | 11/2017 | Sakamoto et al. | |

FOREIGN PATENT DOCUMENTS

| | | |
|---|---|---|
| CN | 105074420 A | 11/2015 |
| CN | 106068093 A | 11/2016 |
| CN | 108982500 A | 12/2018 |
| CN | 109031643 A | 12/2018 |
| CN | 110007455 A | 7/2019 |
| CN | 110619318 A | 12/2019 |
| WO | WO 2018082085 A1 | 5/2018 |

OTHER PUBLICATIONS

"Google Develops an Augmented Reality Powered Microscope for Real-Time Cancer Detection Which Can Save Millions of Lives", Apr. 17, 2018, 15 pgs., Retrieved from the Internet: https://www.sohu.com/a/228573835_390227.
Tencent Technology, ISR, PCT/CN2020/115214, dated Dec. 15, 2020, 3 pgs.
Xiao Nao Xin, "Pathology Market Report: Artificial Intelligence Diagnosis to Revolutionize the Digital Pathology Industry", May 29, 2019, 2 pgs., Retrieved from the Internet: https://www.pinlue.com/article/2019/05/2923/499070147031.html.
Tencent Technology, WO, PCT/CN2020/115214, dated Dec. 15, 2020, 5 pgs.
Tencent Technology, IPRP, PCT/CN2020/115214, dated Mar. 15, 2022, 6 pgs.
Extended European Search Report, EP20869050.3, dated Jun. 10, 2022, 7 pgs.
Po-Hsuan (Cameron) Chen et al., "Microscope 2.0: An Augmented Reality Microscope with Real-time Artificial Intelligence Integration", Google AI Healthcare, Mountain View, CA, Nov. 21, 2018, XP081662644, 28 pgs.
Narges Razavian, "Augmented Reality Microscopes for Cancer Histopathology", Nature Medicine, Nature Publishing Group US, vol. 25, No. 9, Sep. 9, 2019, XP036881219, 3 pgs.

* cited by examiner

IMAGE PROCESSING METHOD, MICROSCOPE, IMAGE PROCESSING SYSTEM, AND MEDIUM BASED ON ARTIFICIAL INTELLIGENCE

CROSS-REFERENCE TO RELATED APPLICATIONS

This application is a continuation application of PCT Patent Application No. PCT/CN2020/115214, entitled "IMAGE PROCESSING METHOD, MICROSCOPE, IMAGE PROCESSING SYSTEM, AND MEDIUM BASED ON ARTIFICIAL INTELLIGENCE" filed on Sep. 15, 2020, which claims priority to Chinese Patent Application No. 201910924607.1, entitled "IMAGE PROCESSING METHOD, MICROSCOPE, IMAGE PROCESSING SYSTEM, AND MEDIUM BASED ON ARTIFICIAL INTELLIGENCE" and filed with the China National Intellectual Property Administration on Sep. 27, 2019, all of which are incorporated herein by reference in their entireties.

FIELD OF THE TECHNOLOGY

The present disclosure relates to the field of image processing, and specifically, to an image processing method, a microscope, an image processing system, and a medium based on artificial intelligence (AI).

BACKGROUND OF THE DISCLOSURE

AI technologies can be widely applied to various fields to implement smart home, smart healthcare, and the like. For example, AI algorithms such as deep neural network (DNN) can be used for processing images and recognizing features. Further, these AI algorithms can implement functions such as lesion recognition, which makes medical services smart, so that limited medical resources become available to more people. Such smart medical services include AI-assisted image analysis, AI-assisted pathological diagnosis, AI-assisted disease recognition, and AI-assisted health management.

SUMMARY

An objective of this application is to provide an image processing method, a microscope, an image processing system, and a medium based on AI.

In one aspect, the present disclosure provides an image processing method based on AI, performed by a computing device, the method including: obtaining a feature recognition result of an image, the feature recognition result being obtained by performing image processing on the image to recognize a feature of the image and the image being obtained by performing image acquisition on a section of a patient using a digital slide scanner to generate a whole slide image (WSI) as the image; determining an imaging area of the section within a field of view of an eyepiece of a microscope with which real-time imaging is performed on the section; determining, within the image, an image area corresponding to the imaging area of the section and acquiring, from the feature recognition result of the image, a target feature recognition result of the image area; and superimposing the target feature recognition result on the imaging area of the section.

In another aspect, the present disclosure provides an image processing system based on AI, including: a digital slide scanner, configured to perform image acquisition on a section and generate a whole slide image (WSI) as an image; a microscope, configured to perform imaging on the section; a processor; and a memory storing a plurality of instructions that, when executed by the processor, perform the foregoing AI-based image processing method.

In still another aspect, the present disclosure further provides a non-transitory computer-readable medium in connection with an image processing system including a digital slide scanner, configured to perform image acquisition on a section of a patient to generate a whole slide image (WSI) as an image, a microscope, configured to perform real-time imaging on the section, and a processor, the non-transitory computer-readable storage medium storing instructions, the instructions, when executed by the processor, causing the image processing system to perform the foregoing image processing method based on AI.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art can still derive other drawings from these accompanying drawings without creative efforts.

DESCRIPTION OF EMBODIMENTS

The technical solutions of the embodiments of the present disclosure are clearly and completely described in the following with reference to the accompanying drawings of the embodiments of the present disclosure. Apparently, the described embodiments are some embodiments rather than all the embodiments of the present disclosure. All other embodiments obtained by a person of ordinary skill in the art based on the embodiments of the present disclosure without creative efforts fall within the protection scope of the present disclosure.

The "first", the "second" and similar terms used in the present disclosure do not indicate any order, quantity or significance, but are used to only distinguish different components. Similarly, "include", "comprise", or similar terms mean that an element or an item appearing in front of the term covers an element or an item and equivalents thereof listed behind the term, but do not exclude another element or item. A similar term such as "connect" or "connection" is not limited to a physical or mechanical connection, but may include an electrical connection, whether direct or indirect.

Flowcharts are used in the present disclosure for describing steps of methods according to the embodiments of the present disclosure. It is to be understood that, the foregoing or following steps are not necessarily strictly performed according to an order. On the contrary, the operations may be performed in a reverse order or simultaneously. In addition, other operations may be alternatively added to the processes.

AI involves theories, methods, technologies, and application systems that use digital computers or machines controlled by the digital computers to simulate, extend, and expand human intelligence, perceive environments, obtain knowledge, and use the knowledge to obtain optimal results. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

Currently, due to factors such as complexity in features of section-based microscopic images, complexity of the AI algorithms, and relatively low image resolutions, feature recognition results obtained based on AI algorithms have relatively low accuracy and serve as auxiliary information merely in general. Moreover, after the feature recognition results are obtained through processing based on the AI algorithms, all the images still need to be verified one by one to determine whether the feature recognition results obtained based on the AI algorithms are accurate. Therefore, the AI algorithms do not lessen the actual workload.

To this end, an embodiment of the present disclosure provides an image processing method based on AI. This method is used for performing image processing on an image by using an AI algorithm to recognize a feature in the image and generating a feature recognition result. In this way, accuracy of image recognition by using the AI algorithm is increased. In addition, the feature recognition result and the image are superimposed, which facilitates verification and makes AI-based image processing more smart.

Figure 1:
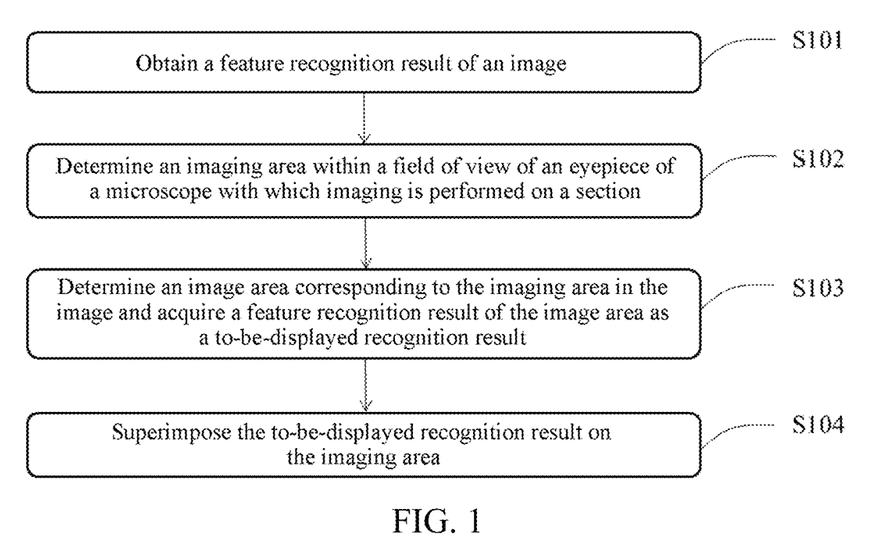
FIG. 1 is a flowchart of an image processing method based on AI according to an embodiment of the present disclosure.

FIG. 1 is a flowchart of the image processing method based on AI according to this embodiment of the present disclosure. Referring to FIG. 1, first, in step S101, the feature recognition result of the image is obtained. The feature recognition result is obtained by performing image processing on the image to recognize the feature in the image. According to this embodiment of the present disclosure, the image is obtained by performing image acquisition on a section of a patient using a digital slide scanner to generate a whole slide image (WSI) as the image. In other words, the section is corresponding to the image. The section may be a form of slide specimen, for example, a biological tissue section or a medical section. An imaging device such as an optical microscope or an electron microscope may be used for performing imaging on the section and observing microscopic tissue within the section. The present disclosure does not limit the specific method of obtaining the section.

In an example, image acquisition may be performed on the section. For example, the section is scanned to generate a WSI as the image. A digital slide scanner may be configured to obtain the WSI through enlarging and scanning, the WSI including all information of the section with relatively high image quality. For example, the digital slide scanner may scan the section at a preset acquisition magnification (for example, 40×). In other words, in the image processing method of the present disclosure, the image on which image processing is performed by using the AI algorithm is a complete image that has the relatively high image quality and is obtained by performing image acquisition on the section. This helps increase accuracy of feature recognition based on the AI algorithm. In this embodiment of the present disclosure, the WSI is used as a specific example of the image for description. It is to be noted that other image acquisition methods may also be used for obtaining the image based on the section, for example, a camera, a video camera, or other image acquisition devices. This embodiment of the present disclosure does not make specific limitations.

In an example, performing image processing on the image to recognize the feature of the image may be implemented based on the AI algorithm. The AI algorithm may be implemented by, for example, a DNN. For example, the DNN may be based on GoogLeNet, AlexNet, ZFnet, ResNet, and other neural network models and perform image processing on the image by training a sample database so as to implement the feature recognition. For example, the feature may be microscopic tissue such as a cell nucleus or cell wall, or may be an image feature such as a transformed cell, tubercle, or aneurysm. Through the training, the AI algorithm can recognize (or detect) whether the foregoing feature is included in the image so as to generate the feature recognition result.

According to this embodiment of the present disclosure, the feature recognition result is an identifier of the feature and a boundary line of the feature. In an example, when the to-be-recognized feature is a transformed cell, image processing may be performed on the image based on the AI algorithm to recognize whether the image includes a transformed cell, and the identifier of the image is generated based on an image processing result. For example, the identifier may be "positive" or "negative", "positive" indicating that the image includes the to-be-recognized feature, while "negative" indicating that the image does not include the to-be-recognized feature. Further, when the image includes the identifier "positive", the feature recognition result may further include the boundary line of the to-be-recognized feature, for example, a boundary line of a range of the transformed cell. In another example, the to-be-recognized feature may also be an erythrocyte. In this case, a quantity of erythrocytes included in the section can be determined. It is to be noted that the image processing method according to this embodiment of the present disclosure does not limit the specific type of the to-be-recognized feature. For example, after different types of training and processing, the AI algorithm can be used for recognizing various types of image features.

According to this embodiment of the present disclosure, the image processing method may further include obtaining verification indication information of the section and performing the imaging on the section based on the verification indication information. Based on the identifier of the feature, verification indication information of the image is generated as the verification indication information of the section corresponding to the image. Specifically, when the image includes the identifier "positive", the verification indication information of the image is generated as the verification indication information of the section corresponding to the image. In the foregoing example of detecting a transformed cell, the verification indication information is generated for the image including the identifier "positive", that is, an image including a transformed cell. The microscope may perform the imaging on the section based on the verification indication information. In other words, the section on which the microscope performs the imaging is only a section recognized as including a transformed cell (that is, including the identifier "positive") by the AI algorithm. This facilitates further verification. For those sections recognized as including no transformed cell (that is, including the identifier "negative") by the AI algorithm, further verification is not required. Therefore, a quantity of sections to be further observed is effectively reduced, which lessens the workload.

Figure 2A:
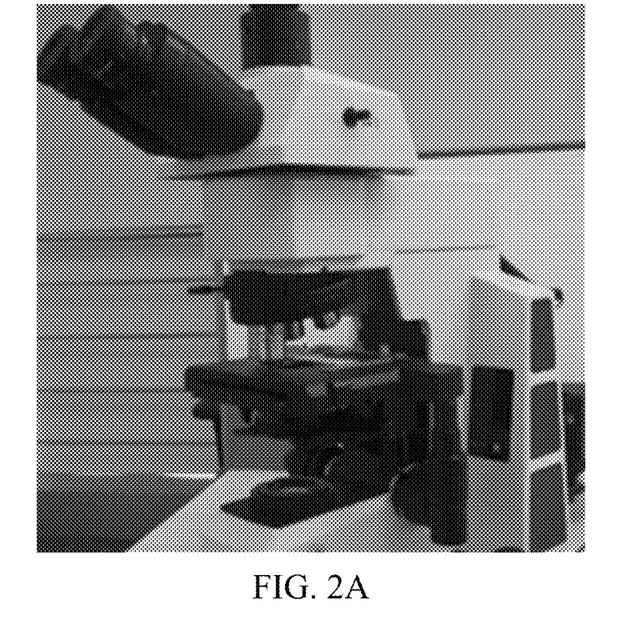
FIG. 2A is a schematic diagram of a microscope performing imaging on a section.

Further referring to FIG. 1, in step S102, an imaging area of the section within a field of view of an eyepiece of the microscope with which the real-time imaging is performed on the section is determined. FIG. 2A is a schematic diagram of the microscope performing imaging on the section. The microscope may be a traditional microscope provided with an objective used for performing magnified imaging on the section. The microscope is further provided with the eyepiece. An enlarged image can be observed through the eyepiece so as to observe microscopic tissue. It is to be noted that, restricted by a magnification and aperture of lens, only a part of the section can be observed within the field of view of the microscope. Given a fixed aperture of lens, a larger magnification indicates a smaller image area of the section that can be observed. The imaging area can be understood as an image range in the section that is seen within the field of view of the eyepiece.

Then, in step S103, an image area corresponding to the imaging area in the image is determined within the WSI image and a target feature recognition result of the image area is acquired from the feature recognition result of the image as a target feature recognition result. Then, in step S104, the target feature recognition result is superimposed on the imaging area of the section.

As described above, in step S101, a feature recognition result corresponding to the entire image can be generated based on the WSI and the like and the AI algorithm. In step S103, the image area corresponding to the imaging area within the field of view of the eyepiece can be determined in the image, the feature recognition result corresponding to the image area can be obtained as the target feature recognition result, and the target feature recognition result can be superimposed on the imaging area. Therefore, the displayed recognition result is consistent with the imaging area within the field of view of the eyepiece. The target feature recognition result is the identifier of the feature and the boundary line of the feature in the image area corresponding to the imaging area within the field of view of the eyepiece. For example, for the image area, the target feature recognition result may include the identifier "positive" or "negative" to indicate whether the image area includes the to-be-recognized feature. If the image area includes the identifier "positive", the target feature recognition result further includes the boundary line of the feature, for example, a boundary line of a transformed cell or an erythrocyte.

In an example, based on the AR technology, the target feature recognition result can be superimposed on the imaging area of the microscope. The AR technology can superimpose virtual information (for example, the target feature recognition result) on real information (for example, the imaging area), so as to integrate real world information with virtual world information. In this way, viewers can obtain information-augmented viewing experience. In this embodiment of the present disclosure, an AR display may be added onto the traditional microscope or integrated into the microscope.

Figure 2B:
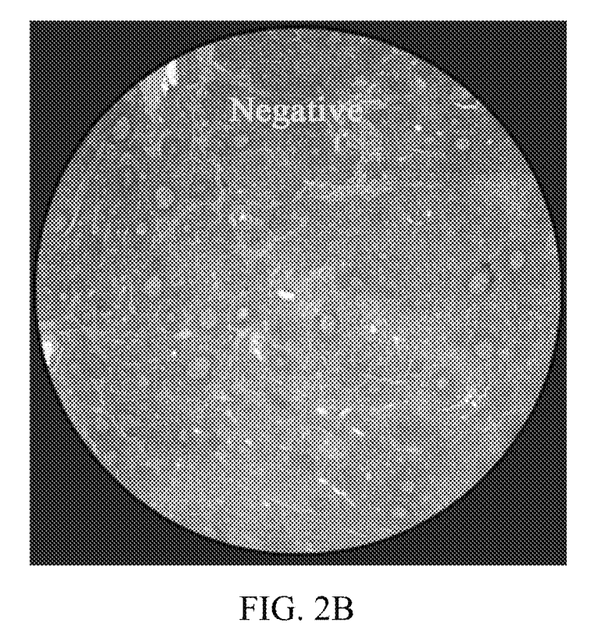
FIG. 2B is a schematic diagram of superimposing a to-be-displayed target feature recognition result.

FIG. 2B is a schematic diagram of superimposing the target feature recognition result, which may be an image viewed through the eyepiece of the microscope. As shown in FIG. 2B, a circular area corresponds to the imaging area in which the microscope performs imaging on the section. In addition, the target feature recognition result corresponding to the imaging area, that is, the identifier "negative", is superimposed on the imaging area. This can, for example, indicate that the imaging area is recognized by the AI algorithm as not including the to-be-recognized feature. The display effect shown in FIG. 2B helps a doctor quickly verify the imaging area in a more intuitive manner.

Figure 2C:
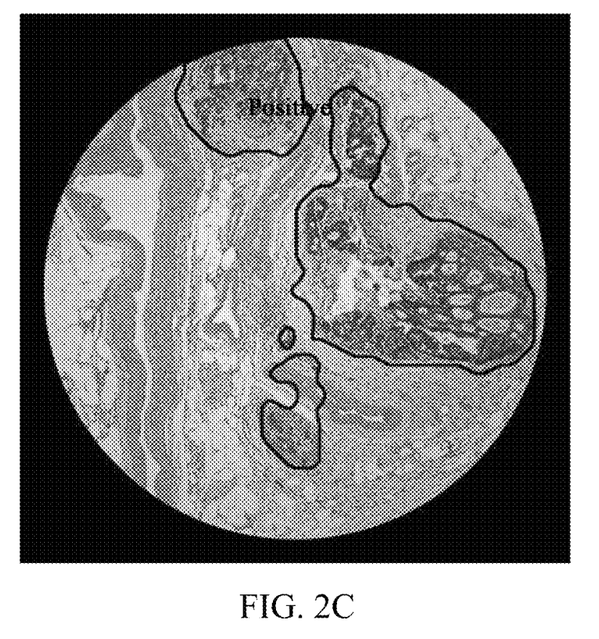
FIG. 2C is another schematic diagram of superimposing the to-be-displayed target feature recognition result.

FIG. 2C is another schematic diagram of superimposing the target feature recognition result. Similarly, a circular area in FIG. 2C corresponds to the imaging area in which the microscope performs imaging on the section. In addition, the target feature recognition result corresponding to the imaging area, that is, the identifier "positive", is superimposed on the imaging area. This indicates that the imaging area is recognized by the AI algorithm as including the to-be-recognized feature. Moreover, the boundary line of the to-be-recognized feature is displayed as black bold lines in FIG. 2C.

According to this embodiment of the present disclosure, step S101 may further be used for performing image processing on a plurality of sections to preliminarily filter the sections. Specifically, after the processing in step S101, when the feature recognition result indicates that the image includes the to-be-recognized feature, the image is identified as "positive". In addition, the image and the feature recognition result of the image can be correlated for storage, for example, through indexing. For the image identified as "positive", perform steps S102 to S104. That is, the microscope performs imaging on the section corresponding to the image and further implements the display processes shown in FIG. 2B and FIG. 2C. This helps further examination, which can be referred to as, for example, a step of "verification". In a case that the feature recognition result indicates that the image does not include the to-be-recognized feature, the image is identified as "negative". For the image identified as "negative", in some embodiments, skip steps S102 to S104. In this case, the sections not including the to-be-recognized feature are filtered out by using the AI algorithm. The foregoing step of verification does not need to be performed on the sections. This lessens the verification workload and increases the efficiency of image feature recognition. In another example, the feature recognition result may further include a recognition confidence, which is used for indicating accuracy of the recognition result. For example, the foregoing step of "verification" may be performed on a section with a recognition confidence less than a preset threshold.

The accuracy and efficiency of the feature recognition are improved by using the image processing algorithm according to the present disclosure. In addition, a section viewed through the microscope is filtered by using the AI algorithm, that is, the sections determined as not including the to-be-recognized feature do not need to be observed. In this way, the verification workload is lessened and unnecessary workload of verifying all sections is avoided.

FIG. 3A to FIG. 3E are schematic flowcharts of determining the image area corresponding to the imaging area. The foregoing processes of determining the image area are described in detail with reference to FIG. 3A to FIG. 3E.

Figure 3A:
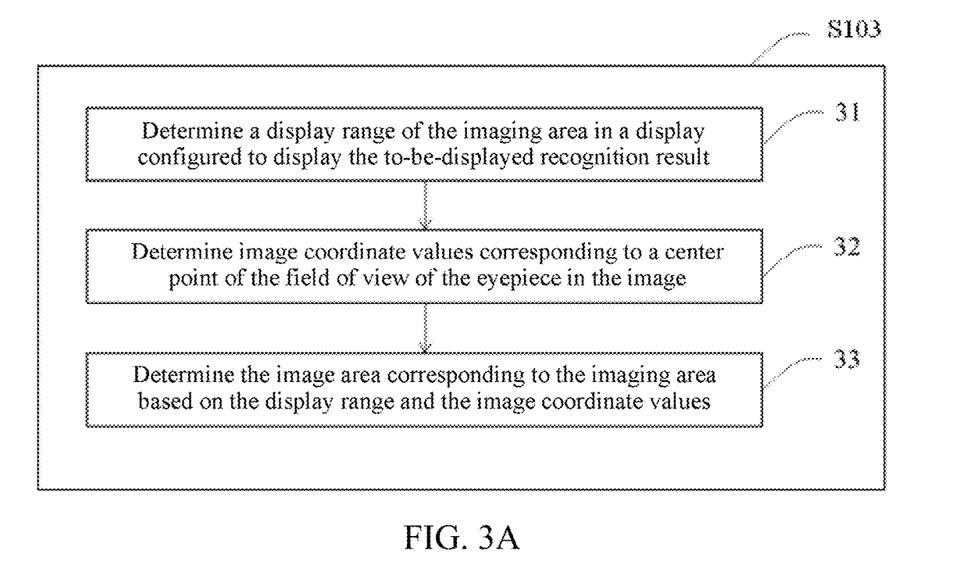
FIG. 3A is a schematic flowchart of determining an image area corresponding to an imaging area in an image according to the embodiment of the present disclosure.

FIG. 3A is a schematic flowchart of determining the image area corresponding to the imaging area in the image (step S103) according to the embodiment of the present disclosure. First, in step 31, in a display configured to display the target feature recognition result, a display range of the imaging area is determined. During the process of performing imaging by using a microscope, a display range is usually a circular area. Therefore, the display range can be denoted by a display radius $r_1$.

The display may be, for example, the AR display configured to superimpose the target feature recognition result on the imaging area in step S104. The display may be integrated into the microscope to implement AR displaying. For example, an area in which the display and the field of view of the eyepiece of the microscope overlap may be determined. The field of view of the eyepiece is circular, and therefore the overlapping area may be denoted as a disc with $(x_{AR}, y_{AR})$ as its center and $r_1$ as its radius. For example, a mouse may be used to draw a circular area along the edge of the field of view of the eyepiece on the display. A range within the circular area is the foregoing overlapping area, so that values of $(x_{AR}, y_{AR})$ and $r_1$ are obtained. Generally, the overlapping area may be in the center of the display. As such, when the display includes 1800*1800 pixels, the parameters $(x_{AR}, y_{AR})$ and $r_1$ may respectively be (900, 900) and 900. In another example, for the microscope integrated with the foregoing AR display, the foregoing values may also be obtained by checking the microscope user manual.

Figure 3B:
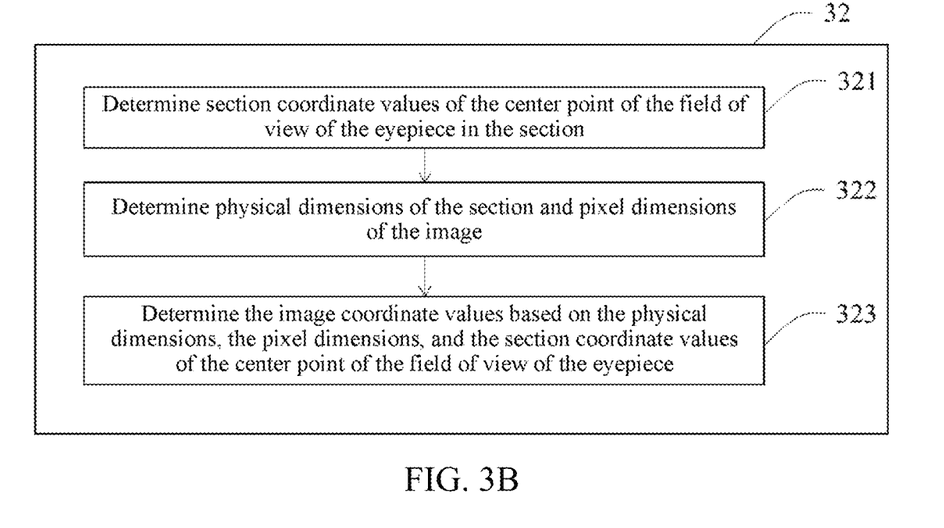
FIG. 3B is a schematic flowchart of determining image coordinate values corresponding to a center point of a field of view of an eyepiece according to the embodiment of the present disclosure.

In step 32, image coordinate values $(x_2, y_2)$ corresponding to a center point of the field of view of the eyepiece are determined in the image. Specifically, FIG. 3B is a schematic flowchart of determining the image coordinate values corresponding to the center point of the field of view of the eyepiece according to the embodiment of the present disclosure. Specifically, step 32 may include steps 321 to 323 shown in FIG. 3B. First, in step 321, section coordinate values $(x_1, y_1)$ of the center point of the field of view of the eyepiece are determined in the section. This step will be further described in the following with reference to FIG. 3C. In step 322, physical dimensions of the section and pixel dimensions of the image are determined. For example, the physical dimensions of the section in lateral and longitudinal directions may respectively be denoted as $W_1$ and $H_1$, while the pixel dimensions of the image in lateral and longitudinal directions may respectively be denoted as $W_2$ and $H_2$.

In step 323, based on the physical dimensions $W_1$ and $H_1$, the pixel dimensions $W_2$ and $H_2$, and the section coordinate values $(x_1, y_1)$ of the center point of the field of view of the eyepiece, the image coordinate values $(x_2, y_2)$ are determined based on the following formula (1):

$$(x_2, y_2) = \left( \frac{x_1 * W_2}{W_1}, \frac{y_1 * H_2}{H_1} \right) \tag{1}$$

Figure 3C:
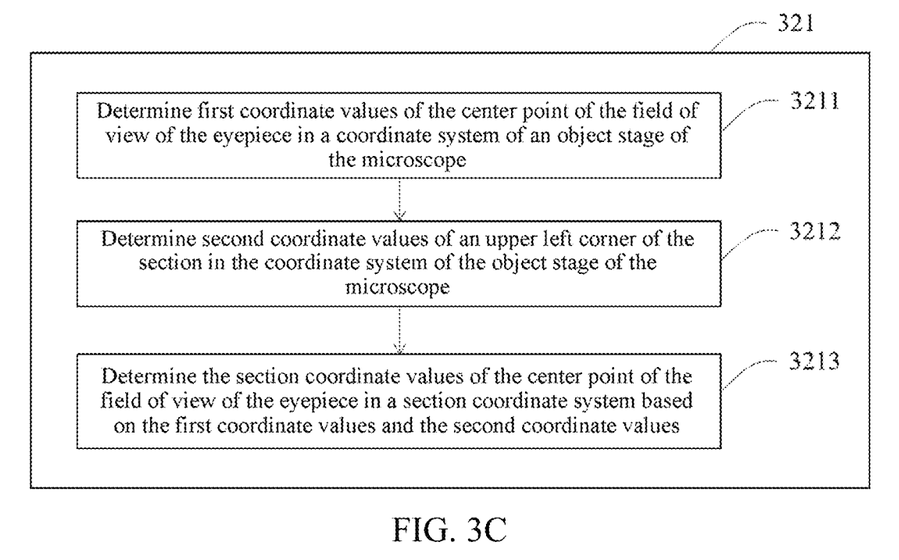
FIG. 3C is a schematic flowchart of determining section coordinate values of the center point of the field of view of the eyepiece according to the embodiment of the present disclosure.

For step 321, FIG. 3C is a schematic diagram of determining the section coordinate values of the field of view of the eyepiece according to the embodiment of the present disclosure. Specifically, step 321 may include steps 3211 to 3213. In step 3211, first coordinate values of the center point of the field of view of the eyepiece in a coordinate system of the object stage of the microscope are determined, and are denoted as $(x_{view}, y_{view})$. Then, in step 3212, second coordinate values of the upper left corner of the section in the coordinate system of the object stage of the microscope are determined, and are denoted as $(x_{slide}, y_{slide})$. In step 3213, based on the first coordinate values and the second coordinate values, the section coordinate values $(x_1, y_i)$ of the center point of the field of view of the eyepiece in a section coordinate system are determined based on the following formula (2):

$$(x_1, y_1) = (x_{view} - x_{slide}, y_{view} - y_{slide}) \tag{2}$$

The section coordinate system uses the upper left corner of the section as an origin, a horizontal direction of the section as a lateral axis, and a vertical direction of the section as a vertical axis. The first coordinate values, the second coordinate values, and the section coordinate values indicate physical lengths.

Referring to FIG. 3A, in step 33, the image area corresponding to the imaging area is determined based on the display range (for example, denoted by the display radius $r_1$) and the image coordinate values $(x_2, y_2)$. Specifically, step 33 may include steps 331 to 333 shown in FIG. 3D. First, in step 331, a recognition radius $r_2$ corresponding to the display radius is determined in the image. Specifically, step 331 may include steps 3311 to 3313 shown in FIG. 3E. In step 3311, an acquisition magnification $m_1$ of the image is determined. In step 3312, an objective magnification $m_2$ of the microscope is determined. In step 3313, based on the display radius $r_1$, the acquisition magnification $m_1$, and the objective magnification $m_2$, the recognition radius $r_2$ is determined based on the following formula (3):

$$r_2 = \frac{r_1 * m_1}{m_2}. \tag{3}$$

For example, the acquisition magnification $m_1$ may be a scanning magnification of the digital slide scanner, which, for example, may be 40× in general. The objective magnification $m_2$ is a magnification at which the objective performs enlarging and imaging on the section, which, for example, may be 5×, 10×, 20×, or 40×.

Figure 3D:
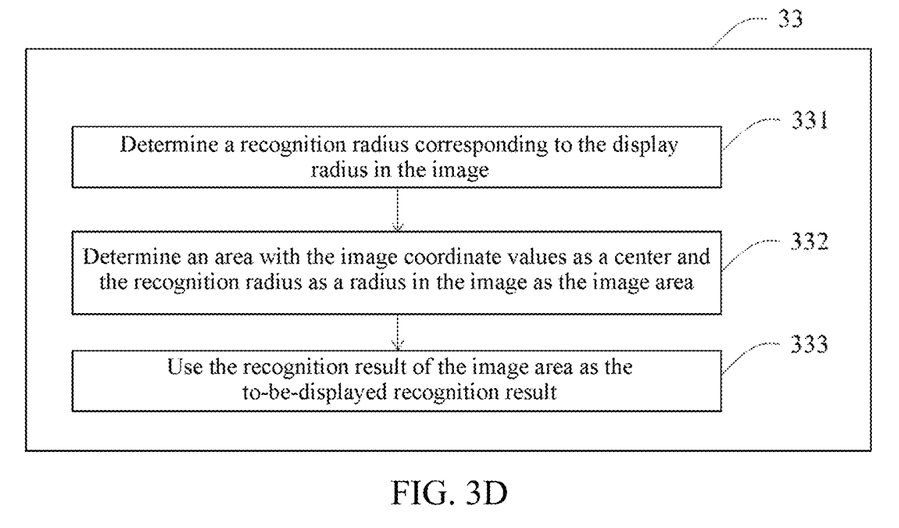
FIG. 3D is a schematic flowchart of determining the image area based on a display radius and the image coordinate values according to the embodiment of the present disclosure.
Figure 3E:
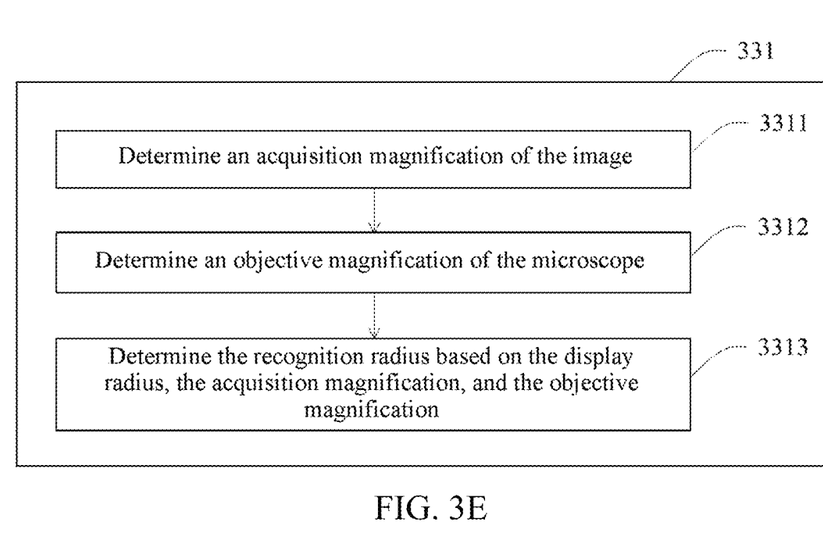
FIG. 3E is a schematic flowchart of determining a recognition radius corresponding to the display radius according to the embodiment of the present disclosure.

As shown in FIG. 3D, in step 332, an area with the image coordinate values $(x_2, y_2)$ as a center and the recognition radius $r_2$ as a radius in the image is determined as the image area. In step 333, the recognition result of the image area is used as the target feature recognition result to be displayed on the display of the microscope.

After the steps shown in FIG. 3A to 3E are performed, the image area corresponding to the imaging area can be determined in the image, and the feature recognition result of the image area can be acquired as the to-be-displayed target feature recognition result. In this way, when the section is observed through the microscope, the feature recognition result obtained based on the AI algorithm can be superimposed on the imaging area within the field of view of the eyepiece, and the displayed feature recognition result corresponds to the current imaging area displayed by the microscope, for example, those shown in FIG. 2B and FIG. 2C. Based on the foregoing display effect of superimposing, the section can be quickly observed in a more intuitive manner. A verification result indicating whether the to-be-recognized feature is included is provided quickly, increasing the accuracy and efficiency of the feature recognition.

Figure 4:
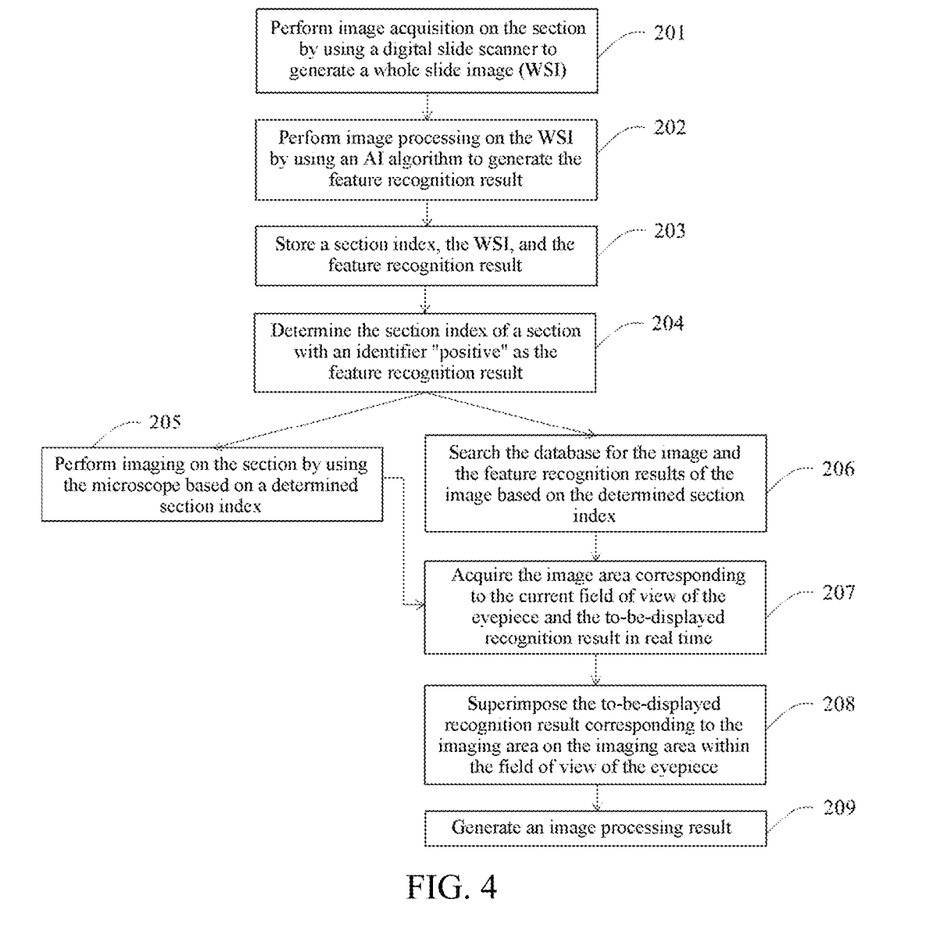
FIG. 4 is an exemplary flowchart of performing feature recognition in the image processing method according to the embodiment of the present disclosure.

FIG. 4 is an exemplary flowchart of performing feature recognition in the image processing method according to the embodiment of the present disclosure. With reference to FIG. 4, the following descries the method in detail by using performing feature recognition in the image processing method according to the present disclosure as an example.

First, in step 201, image acquisition is performed on the section by using the digital slide scanner to generate the WSI. In step 202, image processing is performed on the WSI by using the AI algorithm to generate the feature recognition result. For example, the feature may be a transformed cell. In this example, the feature recognition result may be a cancer feature recognition result. The following describes steps in FIG. 4 by using transformed feature recognition as an example. It is to be noted that the feature is not limited to a transformed cell.

As shown in FIG. 4, in step 203, a section index, the WSI, and the feature recognition result may be stored, for example, in a database. In step 204, the section index of a section with an identifier "positive" is determined as the cancer feature recognition result. Verification indication information may also be generated. For example, a plurality of sections may be included. A plurality of WSIs corresponding to the sections are obtained by scanning the sections respectively and cancer feature recognition results of the images are generated by performing image processing on the WSIs. Based on the feature recognition results, the WSIs may be filtered, that is, to filter out a WSI identified as "positive".

Then, step 205 is performed on the section that is filtered out. Based on a determined section index, imaging is performed on the section by using the microscope. In addition, in step 206, the database may be searched for the image and the feature recognition results of the image based on the determined section index, so as to generate the to-be-displayed target feature recognition result.

In step 207, the image area corresponding to the current field of view of the eyepiece and the to-be-displayed target feature recognition result are acquired in real time. In step 208, the to-be-displayed target feature recognition result corresponding to the imaging area is superimposed on the imaging area within the field of view of the eyepiece. Specifically, the process of acquiring the to-be-displayed target feature recognition result corresponding to the imaging area may be performed with reference to the descriptions of FIG. 3A to 3E. Details are not described herein again. In step 209, a final image processing result may be generated based on the content displayed in step 208.

By using the image processing method according to the present disclosure, the accuracy of image recognition performed by using the AI algorithm can be increased. In addition, the feature recognition result and the image are superimposed, which facilitates verification and makes AI-based image processing more intelligent.

Figure 5:
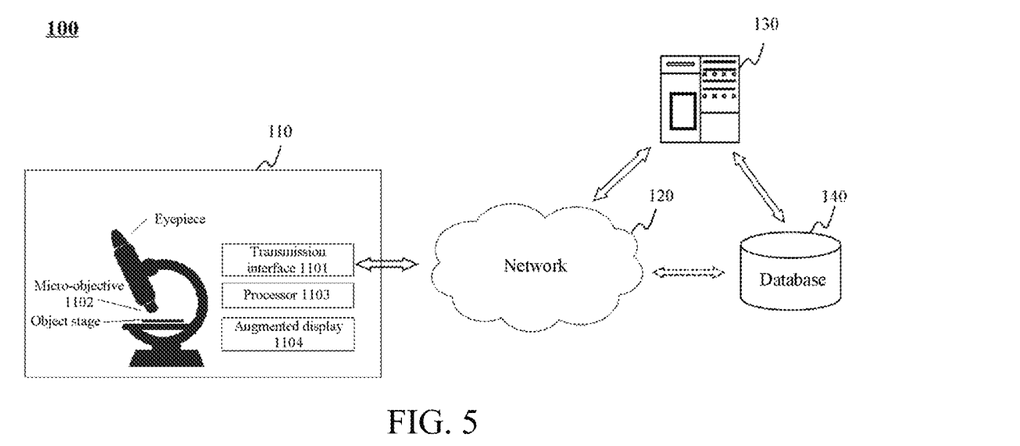
FIG. 5 is a schematic diagram of a microscope according to an embodiment of the present disclosure.

In another aspect, the present disclosure further provides a microscope based on AI. FIG. 5 is a schematic diagram 100 of the microscope according to an embodiment of the present disclosure.

As shown in FIG. 5, the microscope 110 based on AI may include a transmission interface 1101, a micro-objective 1102, a processor 1103, and an AR display (or referred to as an augmented display) 1104.

The transmission interface 1101 may be configured to receive a feature recognition result of an image, the image being obtained by performing image acquisition on a section. For example, the image is a WSI generated by performing image acquisition on the section by a digital slide scanner. For example, the transmission interface 1101 may receive the feature recognition result through a network 120, which will be described in detail in the following.

According to the embodiment of the present disclosure, the feature recognition result is obtained by performing image processing on the image to recognize a feature in the image. For example, the image processing may be performed on the image based on an AI algorithm to recognize the feature in the image, so as to obtain the feature recognition result of the image.

The micro-objective 1102 may be configured to perform imaging on the section. The processor 1103 may be configured to: determine an imaging area within a field of view of an eyepiece when the micro-objective 1102 performs imaging on the section; determine an image area corresponding to the imaging area in the image and acquire the feature recognition result of the image area as a to-be-displayed target feature recognition result. The AR display 1104 may be configured to superimpose the to-be-displayed target feature recognition result on the imaging area.

According to this embodiment of the present disclosure, the feature recognition result may be an identifier of the feature and a boundary line of the feature. The processor 1103 is further configured to acquire verification indication information of the section. The micro-objective 1102 performs imaging on the section using the microscope based on the verification indication information. Verification indication information of the image is generated based on the identifier of the feature as the verification indication information of the section corresponding to the image.

In addition, the processor 1103 may further be directly or indirectly connected to a memory, the memory storing computer-readable code, the computer-readable code, when executed by the processor 1103, can implement all or some of the steps of the foregoing image processing method based on AI.

The transmission interface 1101 may be connected to the network 120 to receive data.

As shown in FIG. 5, the microscope 110 provided in this embodiment of the present disclosure may be configured to receive data, such as the feature recognition result. In some embodiments, the processor 1103 integrated into the microscope 110 may be configured to perform the image processing method provided in the embodiments of the present disclosure. In some implementations, the microscope 110 may use an embedded application program to perform the image processing method based on AI provided in the embodiments of the present disclosure. In other implementations, the microscope 110 may invoke an externally stored application program to perform the image processing method provided in the embodiments of the present disclosure.

In some other embodiments, the microscope 110 may also send microscope parameters to a server 130 through the network 120, and the server 130 performs the image processing method provided in the embodiments of the present disclosure. In some implementations, the server 130 may use an application program embedded in the server to perform the image processing method provided in the embodiments of the present disclosure. In other implementations, the server 130 may invoke an application program stored outside the server to perform the image processing method provided in the embodiments of the present disclosure.

The network 120 may be a single network or a combination of at least two different networks. For example, the network 120 may include, but not limited to, one of or a combination of more than one of a local area network (LAN), a wide area network (WAN), a public network, a private network, and the like.

The server 130 may be a single server or a server cluster, and servers in the cluster are connected by a wired or wireless network. The server cluster may be a centralized server, for example, a data center, or a distributed server. The server 130 may be a local server or a remote server.

A database 140 may generally refer to a device having a storage function. The database 140 is mainly configured to store various types of data used, generated, and outputted during operating of the microscope 110 and the server 130. The database 140 may be a local database or a remote database. The database 140 may include various types of memories, for example, a random access memory (RAM) and a read-only memory (ROM). The storage devices mentioned above are only some listed examples, and storage devices that may be used by the system are not limited thereto.

The database 140 may connect to or communicate with the server 130 or a part thereof through the network 120, or directly connect to or communicate with the server 130, or a combination of the foregoing two manners is used.

In some embodiments, the database 140 may be an independent device. In other embodiments, the database 140 may be alternatively integrated into at least one of the microscope 110 and the server 130. For example, the database 140 may be disposed on the microscope 110 or the server 130. In another example, the database 140 may alternatively be distributed, a part thereof being disposed on the microscope 110, and another part thereof being disposed on the server 130.

It is to be noted that in addition to the components shown in FIG. 5, the microscope 110 may further include other components that implement its functions, for example, an object stage, and limitations are not made thereto.

Figure 6:
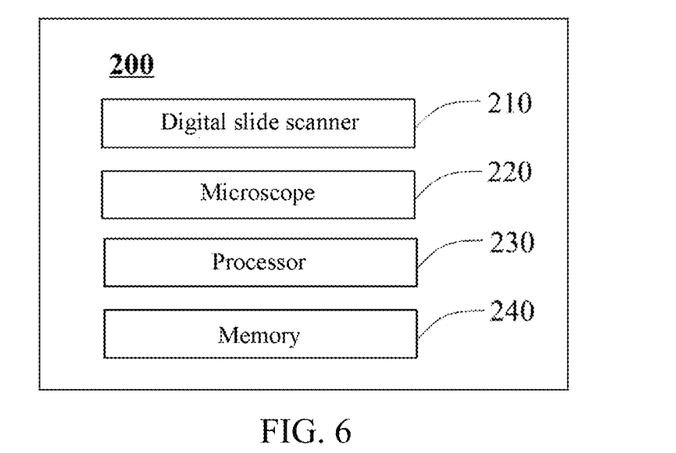
FIG. 6 is a schematic block diagram of an image processing system based on AI according to an embodiment of the present disclosure.

In still another aspect, the present disclosure further provides an image processing system 200 based on AI. FIG. 6 is a schematic block diagram of the image processing system according to an embodiment of the present disclosure.

As shown in FIG. 6, the image processing system 200 may include a digital slide scanner 210, a microscope 220, a processor 230, and a memory 240.

The digital slide scanner 210 may be configured to perform image acquisition on a section to generate a WSI as an image. The microscope 220 may be configured to perform imaging on the section. For example, the microscope 220 may be the microscope 110 shown in FIG. 5.

In a specific embodiment, the digital slide scanner 210 may scan the section and acquire the WSI as the image. Then, the processor 230 may connect to the digital slide scanner 210 in a wired and/or wireless manner to receive the image. Then, the processor 230 may run computer-readable code stored in the memory 240 to perform the foregoing image processing method based on AI, so as to implement feature recognition based on the section. According to the embodiments of the present disclosure, the image processing system 200 may further include an AR display, configured to superimpose a feature recognition result of the image on an imaging area of the microscope 220. For the display effect, refer to FIG. 2B and FIG. 2C. Details are not described herein again.

Figure 7:
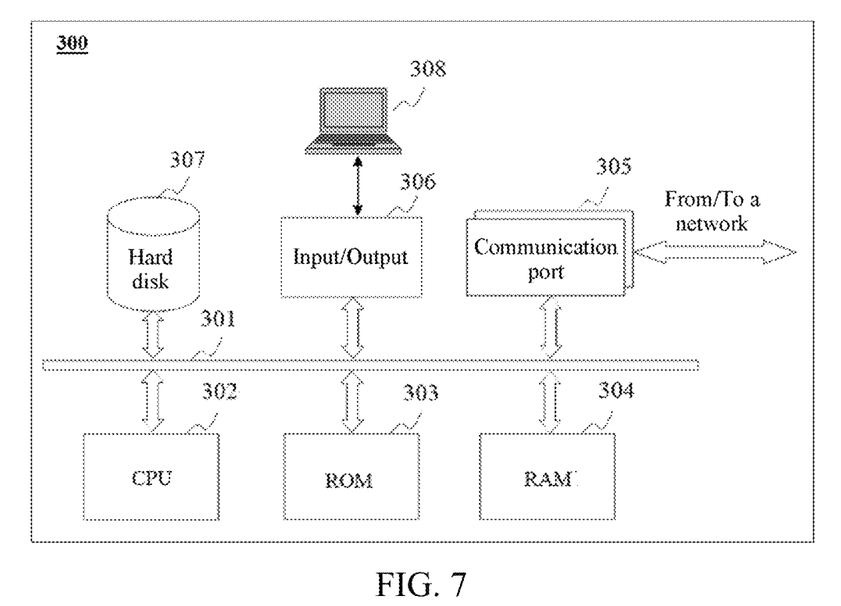
FIG. 7 is a schematic diagram of an architecture of an exemplary computing device according to an embodiment of the present disclosure.

The method or apparatus according to the embodiments of the present disclosure may alternatively be implemented by using an architecture of a computing device 300 shown in FIG. 7. As shown in FIG. 7, the computing device 300 may include a bus 301, one or more central processing units (CPUs) 302, a ROM 303, a RAM 304, a communication port 305 connected to a network, an input/output component 306, a hard disk 307, and the like. A storage device, for example, the ROM 303 or the hard disk 307, in the computing device 300 may store various types of data or files used in processing and/or communication in the image processing method based on AI provided in the embodiments of the present disclosure and program instructions executed by the one or more CPUs. The computing device 300 may further include a user interface 308. Certainly, the architecture shown in FIG. 7 is only exemplary, and when different devices are implemented, one or more components in the computing device shown in FIG. 7 may be omitted as required.

Figure 8:
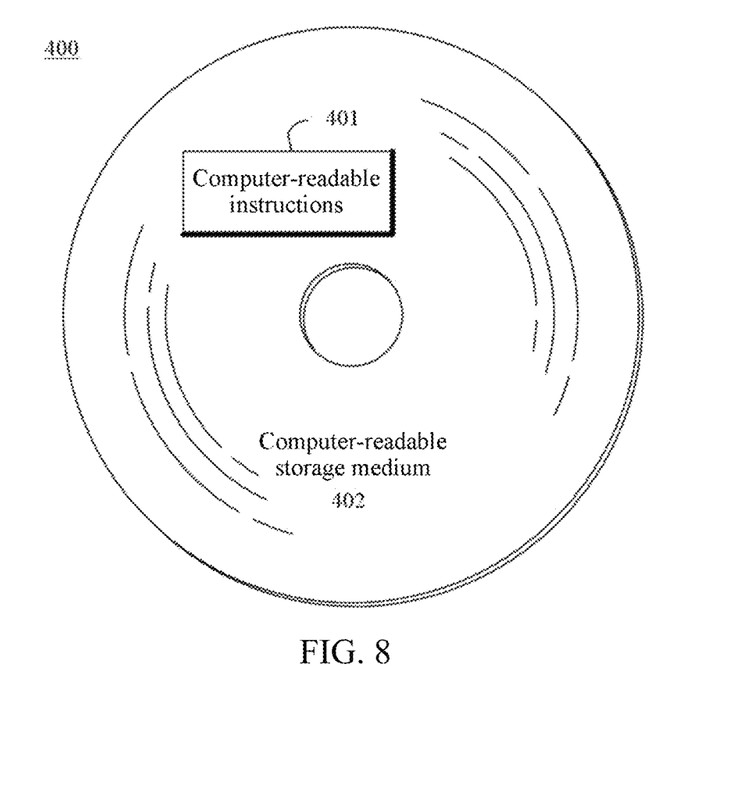
FIG. 8 is a schematic diagram of a computer-readable storage medium according to an embodiment of the present disclosure.

In another aspect, the present disclosure further provides a computer-readable storage medium. FIG. 8 is a schematic diagram 400 of the storage medium according to an embodiment of the present disclosure.

As shown in FIG. 8, the computer-readable storage medium 402 stores computer-readable instructions 401. The computer-readable instructions 401, when executed by a processor, may perform the image processing method based on AI according to the embodiments of the present disclosure described with reference to the foregoing accompanying drawings. The computer-readable storage medium includes, but is not limited to, a volatile memory and/or a non-volatile memory. For example, the volatile memory may include a RAM and/or a cache. For example, the non-volatile memory may include a ROM, a hard disk, a flash memory, and the like. For example, the computer-readable storage medium 402 may connect to a computing device such as a computer and the like. Then, when running the computer-readable instructions 401 stored on the computer-readable storage medium 402, the computing device can perform the foregoing image processing method based on AI according to the embodiments of the present disclosure.

A person skilled in the art can understand that, content disclosed in the present disclosure may have various variations and improvements. For example, the devices or components described above may be implemented by using hardware, or may be implemented by using software, firmware, or a combination of some or all of the software, the firmware, and the hardware.

In addition, although the present disclosure makes various references to some units in the system according to the embodiments of the present disclosure, any quantity of different units may be used and run on a client and/or a server. The units are only illustrative, and different aspects of the system and method may use different units.

A person of ordinary skill in the art may understand that all or some of the steps in the foregoing method may be implemented by a program instructing relevant hardware. The program may be stored in a computer-readable storage medium, for example, a ROM, a magnetic disk, or an optical disc. Optionally, all or some of the steps in the foregoing embodiments may be alternatively implemented by using one or more integrated circuits. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. Correspondingly, the modules/units in the foregoing embodiments may be implemented in the form of hardware, or may be implemented in the form of a software functional module. The present disclosure is not limited to any specific form of combination of hardware and software.

Unless otherwise defined, all terms (including technical and scientific terms) used herein have the same meaning as commonly understood by one of ordinary skill in the art to which the present disclosure belongs. It is further to be understood that, the terms such as those defined in commonly used dictionaries are to be interpreted as having meanings that are consistent with the meanings in the context of the related art, and are not to be interpreted in an idealized or extremely formalized sense, unless expressively so defined herein.

The above is description of the present disclosure, and is not to be considered as a limitation on the present disclosure. Although several exemplary embodiments of the present disclosure are described, a person skilled in the art may easily understand that, many changes can be made to the exemplary embodiments without departing from novel teaching and advantages of the present disclosure. Therefore, the changes are intended to be included within the scope of the present disclosure as defined by the claims. It is to be understood that, the above is description of the present disclosure, and is not to be considered to be limited by the disclosed specific embodiments, and modifications to the disclosed embodiments and other embodiments fall within the scope of the appended claims. The present disclosure is subject to the claims and equivalents thereof

What is claimed is:

1. An image processing method performed by a computing device, the method comprising:
    obtaining a feature recognition result of an image by performing image processing on the image to recognize a feature in the image, wherein the image is obtained by performing image acquisition on a section of a patient sample using a digital slide scanner to generate a whole slide image (WSI) as the image;
    in accordance with a determination that the feature recognition result corresponds to a positive result:
        determining an imaging area of the section within a field of view of an eyepiece of a microscope with which real-time imaging is performed on the section;
        determining, within the image, a real-time image area corresponding to the imaging area of the section;
        acquiring, from the feature recognition result of the image, a target feature recognition result of the real-time image area according to its image coordinate values; and
        superimposing the target feature recognition result on the imaging area of the section.

2. The image processing method according to claim 1, wherein the feature recognition result includes an identifier of the feature and a boundary line of the feature.

3. The image processing method according to claim 2, further comprising:
    acquiring verification indication information of the section; and
    performing imaging on the section using the microscope based on the verification indication information of the section,
    wherein verification indication information of the image is generated as the verification indication information of the section corresponding to the image based on the identifier of the feature.

4. The image processing method according to claim 1, wherein determining, within the image, the real-time image area corresponding to the imaging area of the section comprises:
    determining a display range of the imaging area in a display of the microscope configured to display the target feature recognition result;
    determining image coordinate values corresponding to a center point of the field of view of the eyepiece of the microscope in the image; and
    determining the real-time image area corresponding to the imaging area based on the display range and the image coordinate values.

5. The image processing method according to claim 4, wherein determining the image coordinate values corresponding to the center point of the field of view of the eyepiece of the microscope in the image comprises:
    determining section coordinate values of the center point of the field of view of the eyepiece in the section;
    determining physical dimensions of the section and pixel dimensions of the image; and
    determining the image coordinate values based on the physical dimensions, the pixel dimensions, and the section coordinate values of the center point of the field of view of the eyepiece, $$(x_2, y_2) = \left(\frac{x_1 * W_2}{W_1}, \frac{y_1 * H_2}{H_1}\right)$$

the image coordinate values being denoted as $(x_2, y_2)$, the section coordinate values of the center point of the field of view of the eyepiece being denoted as $(x_1, y_1)$, physical dimensions of the section in lateral and longitudinal directions being respectively denoted as $W_1$ and $H_1$, and pixel dimensions of the image in lateral and longitudinal directions being respectively denoted as $W_2$ and $H_2$.

6. The image processing method according to claim 5, wherein determining the section coordinate values of the center point of the field of view of the eyepiece in the section comprises:
    determining first coordinate values of the center point of the field of view of the eyepiece in a coordinate system of an object stage of the microscope;
    determining second coordinate values of an upper left corner of the section in the coordinate system of the object stage of the microscope; and
    determining the section coordinate values of the center point of the field of view of the eyepiece in a section coordinate system based on the first coordinate values and the second coordinate values, the section coordinate system using the upper left corner of the section as an origin, a horizontal direction of the section as a lateral axis, and a vertical direction of the section as a vertical axis, and the first coordinate values, the second coordinate values, and the section coordinate values indicating physical lengths.

7. The image processing method according to claim 4, wherein;
the display range is indicated by a display radius; and
determining the real-time image area corresponding to the imaging area based on the display range and the image coordinate values comprises:
 determining a recognition radius corresponding to the display radius in the image;
 determining an area with the image coordinate values as a center and the recognition radius as a radius in the image as the real-time image area, and
 using a recognition result of the real-time image area as the target feature recognition result.

8. The image processing method according to claim 7, wherein determining the recognition radius corresponding to the display radius in the image comprises:
determining an acquisition magnification of the image;
determining an objective magnification of the microscope; and
determining the recognition radius based on the display radius, the acquisition magnification, and the objective magnification, $$r_2 = \frac{r_1 * m_1}{m_2}$$

$r_2$ indicating the recognition radius, $r_1$ indicating the display radius, $m_1$ indicating the acquisition radius, and $m_2$ indicating the objective magnification.

9. An image processing system, comprising:
a digital slide scanner, configured to perform image acquisition on a section of a patient sample to generate a whole slide image (WSI) as an image;
a microscope, configured to perform real-time imaging on the section;
a processor; and
a memory, the memory storing a plurality of instructions that, when executed by the processor, cause the image processing system to perform a plurality of operations, including:
obtaining a feature recognition result of the image by performing image processing on the image to recognize a feature in the image;
in accordance with a determination that the feature recognition result corresponds to a positive result:
 determining an imaging area of the section within a field of view of an eyepiece of the microscope with which the real-time imaging is performed on the section;
 determining, within the image, a real-time image area corresponding to the imaging area of the section;
 acquiring, from the feature recognition result of the image, a target feature recognition result of the real-time image area according to its image coordinate values; and
 superimposing the target feature recognition result on the imaging area of the section.

10. The image processing system according to claim 9, wherein the feature recognition result includes an identifier of the feature and a boundary line of the feature.

11. The image processing system according to claim 10, wherein the plurality of operations further comprise:
acquiring verification indication information of the section; and
performing imaging on the section using the microscope based on the verification indication information of the section,
wherein verification indication information of the image is generated as the verification indication information of the section corresponding to the image based on the identifier of the feature.

12. The image processing system according to claim 9, wherein determining, within the image, the real-time image area corresponding to the imaging area of the section comprises:
determining a display range of the imaging area in a display of the microscope configured to display the target feature recognition result;
determining image coordinate values corresponding to a center point of the field of view of the eyepiece of the microscope in the image; and
determining the real-time image area corresponding to the imaging area based on the display range and the image coordinate values.

13. The image processing system according to claim 12, wherein determining the image coordinate values corresponding to the center point of the field of view of the eyepiece of the microscope in the image comprises:
determining section coordinate values of the center point of the field of view of the eyepiece in the section;
determining physical dimensions of the section and pixel dimensions of the image; and
determining the image coordinate values based on the physical dimensions, the pixel dimensions, and the section coordinate values of the center point of the field of view of the eyepiece, $$(x_2, y_2) = \left(\frac{x_1 * W_2}{W_1}, \frac{y_1 * H_2}{H_1}\right)$$

the image coordinate values being denoted as $(X_2, y_2)$, the section coordinate values of the center point of the field of view of the eyepiece being denoted as $(X_1, y_1)$, physical dimensions of the section in lateral and longitudinal directions being respectively denoted as $W_1$ and $H_1$, and pixel dimensions of the image in lateral and longitudinal directions being respectively denoted as $W_2$ and $H_2$.

14. The image processing system according to claim 13, wherein determining the section coordinate values of the center point of the field of view of the eyepiece in the section comprises:
determining first coordinate values of the center point of the field of view of the eyepiece in a coordinate system of an object stage of the microscope;
determining second coordinate values of an upper left corner of the section in the coordinate system of the object stage of the microscope; and
determining the section coordinate values of the center point of the field of view of the eyepiece in a section coordinate system based on the first coordinate values and the second coordinate values, the section coordinate system using the upper left corner of the section as an origin, a horizontal direction of the section as a lateral axis, and a vertical direction of the section as a vertical axis, and the first coordinate values, the second coordinate values, and the section coordinate values indicating physical lengths.

15. The image processing system according to claim 12, wherein;

the display range is indicated by a display radius; and
determining the real-time image area corresponding to the imaging area based on the display range and the image coordinate values comprises:
determining a recognition radius corresponding to the display radius in the image;
determining an area with the image coordinate values as a center and the recognition radius as a radius in the image as the real-time image area; and
using a recognition result of the real-time image area as the target feature recognition result.

16. The image processing system according to claim 15, wherein determining the recognition radius corresponding to the display radius in the image comprises:
determining an acquisition magnification of the image;
determining an objective magnification of the microscope; and
determining the recognition radius based on the display radius, the acquisition magnification, and the objective magnification, $$r_2 = \frac{r_1 * m_1}{m_2}$$

$r_2$ indicating the recognition radius, $r_1$ indicating the display radius, $m_1$ indicating the acquisition radius, and $m_2$ indicating the objective magnification.

17. A non-transitory computer-readable storage medium in connection with an image processing system including a digital slide scanner, configured to perform image acquisition on a section of a patient sample to generate a whole slide image (WSI) as an image, a microscope, configured to perform real-time imaging on the section, and a processor, the non-transitory computer-readable storage medium storing instructions, the instructions, when executed by the processor, cause the image processing system to perform a plurality of operations including:

obtaining a feature recognition result of the image by performing image processing on the image to recognize a feature in the image;
in accordance with a determination that the feature recognition result corresponds to a positive result:
determining an imaging area of the section within a field of view of an eyepiece of the microscope with which the real-time imaging is performed on the section;
determining, within the image, a real-time image area corresponding to the imaging area of the section;
acquiring, from the feature recognition result of the image, a target feature recognition result of the real-time image area according to its image coordinate values; and
superimposing the target feature recognition result on the imaging area of the section.

18. The non-transitory computer-readable storage medium according to claim 17, wherein the feature recognition result includes an identifier of the feature and a boundary line of the feature.

19. The non-transitory computer-readable storage medium according to claim 18, wherein the plurality of operations further comprise:
acquiring verification indication information of the section; and
performing imaging on the section using the microscope based on the verification indication information of the section,
wherein verification indication information of the image is generated as the verification indication information of the section corresponding to the image based on the identifier of the feature.

20. The non-transitory computer-readable storage medium according to claim 17, wherein determining, within the image, the real-time image area corresponding to the imaging area of the section comprises:
determining a display range of the imaging area in a display of the microscope configured to display the target feature recognition result;
determining image coordinate values corresponding to a center point of the field of view of the eyepiece of the microscope in the image; and
determining the real-time image area corresponding to the imaging area based on the display range and the image coordinate values.

\* \* \* \* \*